United States Patent [19]

Borsuk

[11] 4,215,937
[45] Aug. 5, 1980

[54] METHOD AND APPARATUS FOR DETECTING OPTIMUM ALIGNMENT OF OPTICAL FIBERS IN A CONNECTOR ARRANGEMENT

[75] Inventor: Leslie M. Borsuk, Los Alamitos, Calif.

[73] Assignee: International Telephone and Telegraph Corporation, New York, N.Y.

[21] Appl. No.: 7,645

[22] Filed: Jan. 29, 1979

[51] Int. Cl.³ .................... G01N 21/00; G01B 11/00
[52] U.S. Cl. .................. 356/73.1; 350/96.15; 350/96.18; 350/96.21; 356/400
[58] Field of Search .................. 356/73.1, 400; 350/96.15, 96.18, 96.21

[56] References Cited

U.S. PATENT DOCUMENTS

| | | | |
|---|---|---|---|
| 3,936,143 | 2/1976 | Sato | 350/96.21 |
| 3,938,895 | 2/1976 | Bridger et al. | 250/227 |

*Primary Examiner*—Vincent P. McGraw
*Attorney, Agent, or Firm*—Thomas L. Peterson

[57] ABSTRACT

A method and apparatus for detecting the lateral alignment of abutting optical fibers in a connector arrangement. A connector assembly having eccentric sleeves for effecting lateral alignment is shown. A light beam is introduced in an angle through the cladding of an optical fiber adjacent to its interface surface within one connector half. The light beam is launched into the fiber cladding at a plurality of angles using a light scattering bead of resin. The outside diameter of the ferrule assembly is concentric with the optical fiber and the connector shell externally, once the lateral alignment is effected. A termination fixture includes an objective lens which projects a magnified image of the optical fiber interface surface onto an aperture plate having an opening or window therein substantially the same diameter as the magnified optical fiber core, transmits substantially only light emitted from the cladding interface surface. A light-to-electric signal transducer (photodiode for example) detects the illuminated and magnified image of the optical fiber cladding. A light intensity null detected by the transducer is indicative of proper alignment of the optical fiber with respect to the outside diameter of the connector shell and ferrule assembly.

10 Claims, 7 Drawing Figures

METHOD AND APPARATUS FOR DETECTING OPTIMUM ALIGNMENT OF OPTICAL FIBERS IN A CONNECTOR ARRANGEMENT

BACKGROUND OF THE INVENTION

1. Field of the Invention

The invention relates to methods and apparatus for detecting alignment of an optical fiber laterally within a support structure or concentrically within the shell of a connector.

DESCRIPTION OF THE PRIOR ART

The comparatively recent development of fiber optic light signal waveguides has ushered in a new era of signal transmission particularly useful in telecommunication systems and other signaling systems. Modulated light signals may be conveyed for relatively long distances with comparatively little attenuation in modern fiber-optic waveguides, preferably of the type in which a main light conducting core is surrounded by an annular cladding having a refractive index less than that of the glass core.

The characteristics of these optical fibers are extensively described in the technical literature, one such description being presented in an article entitled "Fiber Optic Communications: A Survey," appearing in the periodical Electrical Communications, Vol. 50, No. 1, 1975, published by International Telephone and Telegraph Corporation.

In practical systems involving fiber optic signalling, connection obviously must be made from cable-to-cable and from cables to repeaters, light signal transmitters, transducers and a host of other electro-optical devices. Inherently, this generates a requirement for connectors, not only of the fixed splice type but also of the demountable (separable) type.

Fiber optic connectors of various types have been proposed and constructed, and these have incorporated various approaches to the general problem of optical fiber alignment. It is known that lateral misalignments between abutting optical fibers produce significant attenuation of light signals, this being a serious problem especially where signals are to be conveyed for significant distances in telecommunications systems and the like.

In addition to various self-aligning connectors, there is another general type of more effective optical fiber connector which may be categorized as the assembly-adjustable type. Such fiber optic connectors are particularly useful in field applications. A first fiber optic waveguide is inserted with its polished end flush with an interface surface of an interface half, and a second cable is similarly installed in a second connector half. In U.S. Pat. No. 3,936,143, such a device is disclosed and described. Two connector body members or halves are mated by conventional means such as a threaded coupling nut. An axial bore in the first half contains the first of a pair of optical fibers which are to be connected. That first connector body half retains the first optical fiber with its polished end flush with an interface surface. The second connector body member comprises a pair of axially extending eccentric sleeves in an eccentric axial connector body bore. The other optical fiber is contained with an eccentric central bore in the innermost of these eccentric sleeves. By relative adjustment of the two sleeves rotationally, the centers of the optical fiber cores of the abutting optical fibers in this arrangement can be made accurately colinear.

Another prior art approach providing means for aligning two optical components such as the abutting optical fibers aforementioned is described in U.S. Pat. No. 3,800,388.

Recognizing the importance of accurate lateral alignment in two coordinates in a plane normal to the longitudinal axis of the abutting optical fibers, the next consideration is in respect to methods and apparatus for monitoring this critical alignment during adjustment and maintaining it so as to optimize light transfer from one optical fiber to another at the abutment interface.

In has been suggested, that a light test signal propagated into the core of a fiber might be used to align the core portions of the abutting optical fibers in an adjustable connector, however, as previously conceived, many practical problems are extant. For example, in order to place a signal into the core of an optical fiber, it is necessary to start with another disconnection point which may in fact be a considerable distance removed. Similarly, to attach a light intensity detector to the other optical fiber, still another discontinuity in the opposite direction must be located. Obviously, an alignment procedure involving distant locations is cumbersome and inconvenient, requiring supplementary communication between the adjustable connector location at the output end of the second optical fiber.

It is also true that alignment based on maximum measured light transmission is difficult to achieve, since a sufficiently sharp maximum point in the alignment versus light transmission may not be obtainable.

Purely mechanical methods of effecting lateral alignment of optical fibers in a connector assembly are inherently less satisfactory than are techniques involving optical confirmation or monitoring of light transmission characteristics through the abutting fiber interface within the connector assembly.

One reason why this is true is the very small size of a typical optical fiber which is normally a "thread-like" conductor. Typical optical fiber diameters are on the order of 0.005 inches, including the cladding (but not jacketing). Thus the centering of a fiber in the adjustable portion of a connector assembly requires minute measurement to very close tolerances if it is attempted as a purely mechanical, unconfirmed procedure.

The manner in which the present invention provides novel apparatus and an effective and novel method for monitoring the proper alignment of optic fibers will be understood as this description proceeds.

SUMMARY OF THE INVENTION

The method of the invention, stated generally, involves the introduction of light into an optical fiber such that light is propagated toward the nearest interface surface of the optical fiber, i.e., within the connector half associated therewith.

The light is introduced into the cladding from the outer perimeter of the fiber at all angles with respect to the fiber axis. The light is refracted at the core cladding interface entering the core at angles (with respect to the fiber axis) exceeding the angle necessary for total internal reflection within the core. The light emerges from the interface surface from both the cladding and core regions. Light emerges from the core interface region at angles greater than the maximum acceptance angle $\theta a$ of the core for propagation solely within the core. Light emerges from the cladding interface region at angles both greater and less than $\theta a$.

The light which emerges from the interface surface is passed through a lens system. The lens numerical aperture is such that light rays at angles greater than $\theta a$ are excluded.

The output light is then projected by the lens system of an aperture plate having a circular opening therein congruent with the magnified outline of the optical fiber core. A light-to-electric signal transducer or light meter receives whatever light passes through this aperture plate opening. If the optical fiber is aligned such that its core perimeter is accurately concentric with the outside circular perimeter of the connector assembly, essentially, the light emerging from the optical fiber cladding falls on the aperture plate radially outward of the opening and, since light rays emerging from the core are not substantially propagated under these circumstances, in view of the angle of light introduction into the optical fiber and the characteristics of the lens system as aforementioned, to light-to-electric transducer receives substantially no light as evidenced by a minimum output therefrom. A light null as an indication of alignment is inherently much more effective than is a maximum.

Misalignment of the optical fiber laterally causes a portion of the annulus corresponding to the magnified cross-section of the optical fiber cladding to fall within the aperture plate opening. Adjustment of the optical fiber lateral position within the connector body shell, as for example, by the aforementioned known double-eccentric sleeve configuration, permits the alignment of the optical fiber as indicated by the output minimum provided by the light-to-electrical signal transducer.

Preferably, each half of the mateable connector assembly should contain the adjustment means for positioning the optical fiber laterally. Accurate concentricity with the external shell of each connector body part then facilitates mating of the connector body halves with accurate alignment of the abutting interfaces of the optical fibers thus joined in a light-transmissive arrangement.

It may be said to have been the general objective of the present invention to provide a method and apparatus for accurate alignment of optical fibers within adjustable connector members, using only relatively simple apparatus in situ, and without cooperation of additional remotely located personnel. The apparatus employed based on the method of the invention is relatively simple and readily adapted to field application.

The details of a typical embodiment of the apparatus of the invention and further description of the principles and steps of the method are presented hereinafter as this description proceeds.

DETAILED DESCRIPTION

Figure 1:
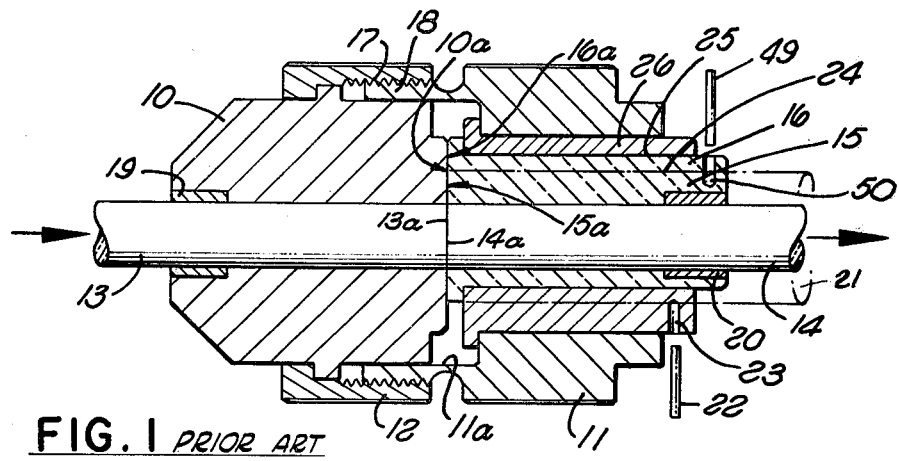
FIG. 1 is a partially-sectioned view of a typical prior art fiber-optic connector with structure for lateral alignment of the optical fiber interface.

Referring now to FIG. 1, a typical prior art fiber optic connector assembly joins two optical fibers 13 and 14 at their interface (end) surfaces 13a and 14a respectively. This connector, known per se, employs the so-called double-eccentric sleeve lateral adjustment apparatus as shown in U.S. Pat. No. 3,936,143. Basically, such a connector has two primary body parts 10 and 11, a coupling nut 12 and three separate eccentric sleeves or tubes 15, 16 and 26.

The optical fibers 13 and 14 (outward of jacket 21) are inserted into body member 10 and inner eccentric sleeve 15, respectively. This insertion is typically accomplished with close fit. An epoxy resin or other adhesive shown at 19 and 20 acts as a setting agent, and may be included to wet the axially bores of parts 10 and 15 prior to insertion of optic fibers 13 and 14. A small amount of fiber protrusion or overlap axially is conventional in the first stages of this fiber insertion process, however, the interface surfaces are subsequently ground and polished so that they are flat and mutually flush to provide the close coupled interface between 13a and 14a as well as between 10a and 15a and 16a when fully assembled.

From the foregoing it will be realized that the inner eccentric sleeve 15 is also cemented to the optical fiber 14, however, sleeve 16 and 26 are rotatable. In the case of 26, a rotational surface exists at 25 and also between 26 and the bore of the body part 11. Similarly, sleeve 16 might be rotated while 26 and 15 remain fixed, the surfaces in rotational contact being 24 and 25 in that instance.

Once the optical fiber interface between 13a and 14a is properly and accurately aligned in both coordinates in the plane of interface, pins 22 and 29 may be inserted in bores 23 and 50 respectively, this "freezing" of the rotational relationship is effected between eccentric sleeves 15 and 16 when pin 49 is inserted into bore 50 and between 16 and 26 when pin 22 is inserted into bore 50 and between 16 and 26 when pin 22 is inserted into bore 23. The pin receiving bores in the innermost part may be drilled in when alignment has been perfected.

It is to be understood that all of the drawings accompanying this specification are much enlarged vis-a-vis the typical size of the optical fibers and the various connector parts. The typical optical fiber is a thread-like element a few thousandths of an inch in diameter. Accordingly, the difficulty of effecting an accurate placement for example of optical fibers 13 and 14 by purely mechanical methods can be appreciated. Still further, typical optical fibers while they may have a comparatively accurate core cross-section, i.e., may have cores of uniform diameter, it is often true that the outside diameter of the cladding is not accurately concentric with the outside diameter of the core. This is a manufacturing reality which must be considered in connector design. As this description proceeds, the unique advantage of the apparatus and method of the invention will be understood.

While optical alignment of fibers 13 and 14 could be effected by passing a light signal through the optical fiber 13, for example, and measuring its output from a remote end of 14, it is often true that the other ends of fibers 13 and 14 may be located at a considerable distance. Accordingly, the provision of a test light beam by the usual method requires the cooperation of others at remote locations both for the provision of the test light beam and for measurement of optical transmission effectiveness at another location as the alignment and adjustment in the connector at the intermediate location is made empirically.

Figure 6:
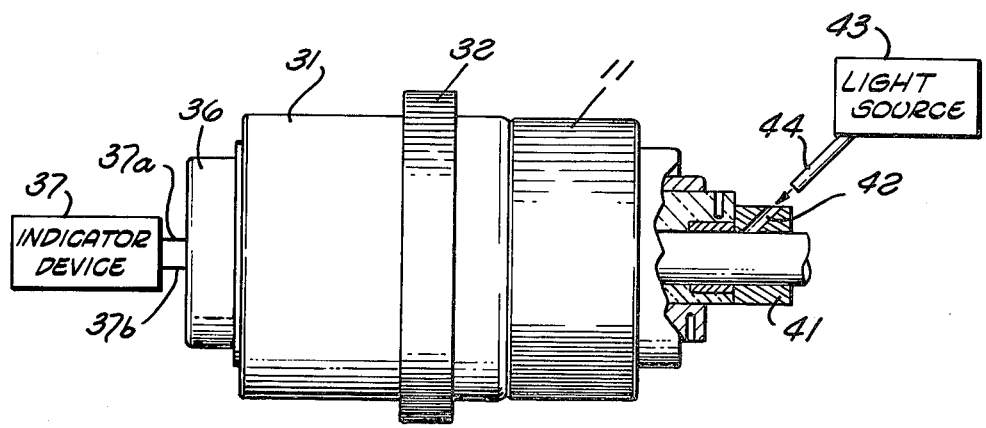
FIG. 6 is an elevation view of the apparatus of FIG. 4 with light source associated therewith.

The illumination of the optical fiber is effected differently in connection with the present invention than is the conventional illumination for signal transmission. In the present apparatus and method the fiber is side illuminated at an angle with respect to its outer perimeter. Looking ahead to FIG. 6 this illumination of the cladding of the optical fiber from an external source will be seen. FIG. 6 will be discussed in more detail subsequently. At this point the theory of this peripheral illumination will be discussed in connection with FIGS. 2 and 3.

Figure 2:
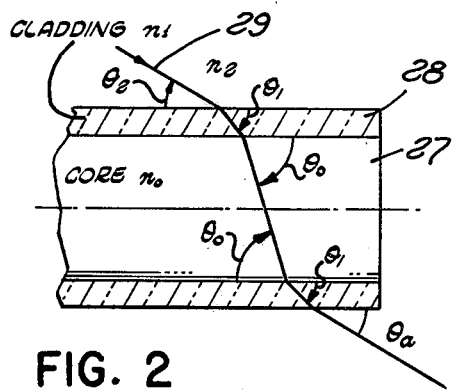
FIG. 2 is a schematic diagram for explanation of the theory of external perimeter test illumination on an optic fiber.

In FIG. 2, a magnified optical fiber having a core 27 and cladding 28 is illustrated. The near field pattern of light which exits from the end of a side-illuminated fiber is a function of the fiber type, fiber numerical aperture and the geometry of the excitation. A ray of light 29 incident at the outer perimeter of the cladding 28 at an angle $\theta_2$ enters the cladding 28. The cladding refractive index $n_1$ is greater than $n_2$ which is the refractive index of the surrounding medium (which may be air). Accordingly, the light ray 29 is refracted into the cladding at an angle $\theta_1$ where $\theta_1$ is greater than $\theta_2$. The ray of light is incident at the angle $\theta_1$ on the outer perimeter of the core with uniform refractive index $n_0$ where $n_0$ is greater than $n_1$. Accordingly, the ray 29 is refracted into the core at an angle $\theta_0$ greater than $\theta_1$. $\theta_0$ is greater than the angle for total internal reflection at the core cladding interface. Where this ray is incident on the opposite wall of the core, the light is refracted into the cladding at the angle $\theta_1$. In addition, where this ray is incident on the opposite cladding perimeter of the fiber, a large fraction of the energy which is refracted into the fiber escapes, as indicated in FIG. 2. For values of angle $\theta_2$ approaching zero, the angle $\theta_1$ remains greater than the maximum angle $\theta_m$ for total internal reflection at the air/glass interface.

Figure 3:
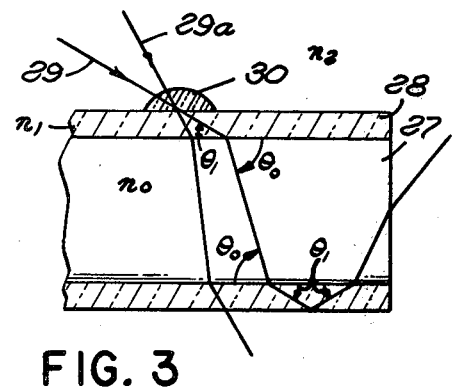
FIG. 3 illustrates the effective angle of light ray introduction as compared to that of FIG. 2.

A technique for reducing the angle $\theta_1$ below the greatest angle permitting total internal reflection at the air/glass interface is illustrated in FIG. 3. If a light ray is incident normal to the convex surface of a generally spherical bead or droplet of transparent material 30 having a refractive index close to or greater than that of the cladding, light rays with angles $\theta_1$ less than that for total internal reflection at the air/glass interface can be introduced into the glass cladding and propagated along the fiber by total internal reflection. Actually, as indicated in FIG. 3, rays at various angles are admitted into the optical fiber, however, those having angles greater than $\theta_m$ emerge from the fiber (such as ray 29a, for example).

It can be shown that the angle of rays emerging from the core interface region in an arrangement such as FIG. 3 make a larger angle with respect to the axis of the fiber than do those emerging from the cladding 28.

The above description is based on ray analysis within a step index optical fiber. An analysis of a graded index fiber, although different in detail, would show that the same apparatus and method as herein described can be used to align the cores.

Figure 4:
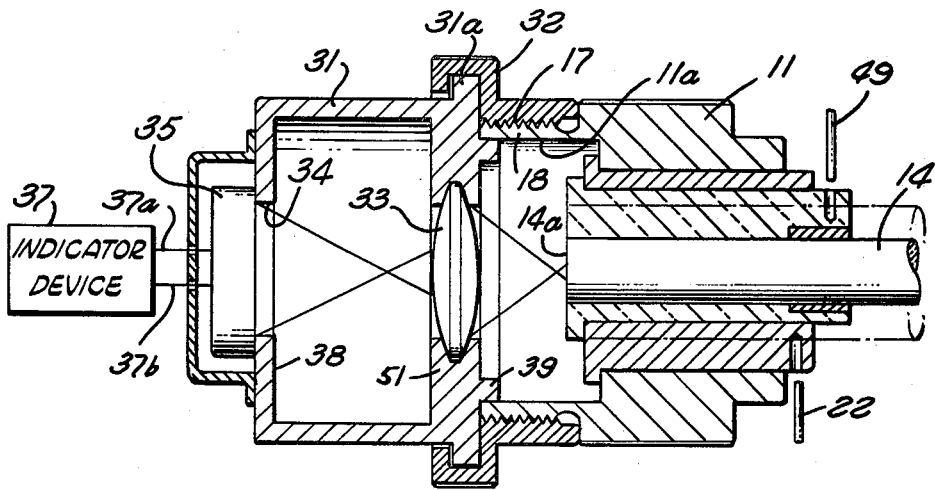
FIG. 4 illustrates, in section, a typical apparatus according to the invention for coupling into an adjustable halve of a connector of FIG. 1 to detect optimum fiber alignment according to the invention.

Referring now to FIG. 4, the optical fiber 14 is to be assumed to be of the form of FIGS. 2 and 3 and to be illuminated according to FIG. 3.

The connector body 11 and all the associated eccentric sleeve structure (right half of FIG. 1) is duplicated in FIG. 4. The connector body part 10 has been removed and instead connector body 11 is coupled to the alignment apparatus housing 31. Housing 31 is illustrated as it might typically be for coupling into connector body 11 of FIG. 1, although it is to be realized that for optimum employment of the apparatus and method according to the invention both halves of the typical prior art connector illustrated in FIG. 1 should contain lateral fiber adjustment apparatus either of the type shown in FIG. 1 or of another type. In the apparatus of FIG. 4, use is made of the fact that the shells of such connectors as shown in FIG. 1 are normally manufactured to close tolerances from stable injection molded plastic materials. Accordingly, the inside surface or bore 11a of body shell 11 within exteriorly threaded extension 18 is accurately circular and accurately concentric about the axial centerline of body shell 11. It is therefore, similarly concentric and accurate in respect to the centerline of the optical fiber 14 when that fiber is accurately centered. In FIG. 4 the test apparatus housing 31 has a circumferential exterior shoulder 31a and interior shoulders 39 so that the threaded engagement 17 may be effected between the coupling nut 32 and the external threads of 18. The interior annular ring 39 fits snugly within the 11a surface, and the entire housing 31 is, therefore, symmetrical about the extended centerline of a properly, laterally-aligned, optical fiber 14. An objective lense 33 serves to project the emitted light from the end surface 14a of the optical fiber onto an aperture plate 38 formed by the end portion of the housing 31 as illustrated. A window or opening 34 of accurate circular shape is also concentric with the lenses 33 and the accurately-aligned optical fiber 14. An optical-to-electric transducer 35, i.e., a photo transistor or the like "sees" only light passing through window 34 and through electrical connections 37a and 37b operates a conventional indicator device 37 to provide a display as a function of the total light passing through the said window 34.

The lens 33 serving as a projection lens is preferably of the form of a standard microscope objective lens mounted in web 51, which is an integral part of housing 31.

Bearing in mind the aforementioned discussion of the rays emitted from optical fiber and 14a via the cladding vis-a-vis those emitted from the core, a very important aspect of the present invention will be seen to be the numerical aperture of the lens 33. This must be selected so that those emitted light rays from the cladding at 14a, which make smaller angles with respect to the optical fiber centerline are accepted and projected onto the aperture plate 38 but the larger angles of rays emitted from the core at 14a cause those light rays to be rejected by lens 33.

Figure 7:
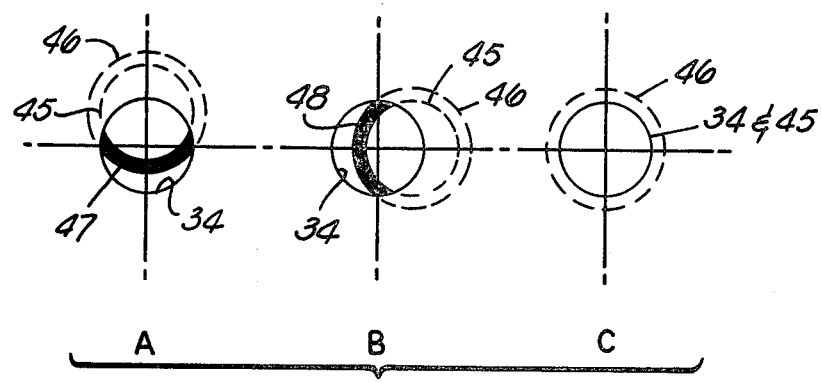
FIGS. 7a, 7b and 7c, illustrate two conditions of lateral misalignment and one condition of accurate alignment, respectively, and their effect on the relative position of the projected light annulus with respect to the aperture plate window of FIG. 4.

Looking ahead to FIG. 7, three conditions as seen by the light-to-electric transducer 35 are depicted. In FIG. 7a, a sector of the light annulus 47 corresponding to the projected optical fiber cladding illumination is shown falling within the window 34 because of a misalignment of optical fiber 14 in the plane of the sheet of FIG. 4. The cladding light annulus between perimeters 45 and 46 falls only partly within window 34 the remainder being hidden from the view of the transducer 35 by the aperture plate 38, producing a lower light reading at 37.

FIG. 7b depicts an orthogonal misalignment producing a sector in the cladding illumination annulus 48 oriented as shown.

In FIG. 7c, accurate alignment is depicted in which the inside diameter 45 of the projected cladding illumination is congruent with the perimeter of the window 34. Accordingly, in FIG. 7c substantially no light passes through the window to be "seen" by the transducer 35. From this it follows that the substantially zero light passage through window 34 depicts accurate alignment of the fiber within its housing body.

It will be realized that the congruence of the inner annulus diameter 45 with the window 34 is an important consideration. If that diameter 45 is larger than the window 34, a certain amount of lateral misalignment can occur before any part of the light annulus appears in the window. Conversely, if the inside diameter of the annulus is smaller than the window diameter, it is impossible to obtain a null indication, and in fact even a light minimum is not a reliable indication of fiber alignment in that case. Several adjustments suggest themselves to those skilled in this art, for example, the lens support 51 might be made axially adjustable, or the housing tube 31 might be constructed as a telescoping element allowing some axial positioning of aperture plate 38. Still further, an iris might be employed at window 34. The construction of the device is obviously subject to variation within the skill of the art of optical systems design. Thus, structure may be designed to accommodate optical fibers of various sizes in one device, however, the entire device is so relatively simple, that its duplication for each connector configuration and optical fiber size is not burdensome.

Figure 5:
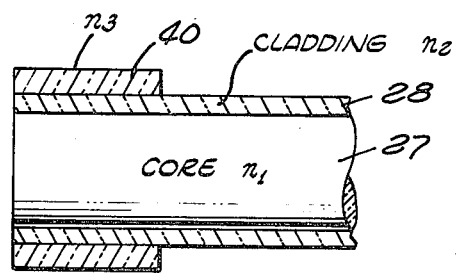
FIG. 5 depicts an alternative arrangement for perimeter illumination of an optical fiber for the purposes of the invention.

Referring now to FIG. 5, an alternative structure for the side admission of the cladding illumination light rays is shown. Over an optical fiber having a core 27 with an index of refraction $n_1$ and a cladding with an index of $n_2$, an outside layer 40 having an index of $n_3$ is applied. Such a material might be an epoxy resin having an index of refraction of approximately 1.61. That order of refractive index is substantially higher than that of the usual cladding materials and this annular tube 40 now becomes an optical waveguide sandwiched between the cladding and the surrounding air. The light annulus it would produce is not necessarily accurately concentric with the optical fiber core, because the intervening cladding is frequently not of uniform thickness about the core. In view of that optical fiber manufacturing characteristic, this alternative scheme, as depicted in FIG. 5 is less desirable than the illumination scheme described hereinbefore. Irrespective of cladding irregularities the inside diameter of the cladding is inherently the same as the outside diameter of the core and, therefore, obviously the inside of the cladding light annulus as projected on the aperture plate 38 can be presumed to be the same as the outside perimeter of the core itself.

Referring now to FIG. 6, the alignment test apparatus of FIG. 4 is shown in elevation with the housing 31 mated to connector body member 11. Transducer end cap 36 serves as a cover therefor.

FIG. 6 further shows the details of the illumination of the cladding. Light source 43, shown schematically, produces rays in a light guiding tube 44 which pass into a bore 42 in the collar 41. This collar 41, not shown in FIG. 1, provides direct access to the cladding of the fiber, the additional means for dealing with the jacket of the optical fiber being not shown, since they may be entirely conventional. The collar 41 need not be a separate part per se but might simply be an extension of the inner eccentric sleeve 15 as depicted in FIG. 1. Thus, the problem of providing light admission through the eccentric sleeves as a group is avoided. Those sleeves might be adjusted into virtually any relative position, complicating the provision of the cladding illuminating light if it must pass through all of the eccentric sleeves as a group. It has been indicated that a bonding resin would normally be employed between the optic fiber and the receiving bore in a connector body part. This also applies to the outer end of collar 41 and at the junction of the light admitting tube and bore 42 (FIG. 6), a convex bead tends to form at the optic fiber surface, providing the effect of bead 30 (FIG. 3).

It will be seen that the apparatus and the method of the invention provide for independent accurate centering of the optical fiber core within a given half of a connector assembly. Notwithstanding the showing of FIG. 1 in which only one-half of the connector assembly, i.e., 11 includes the fiber lateral adjustment means, optimum employment of the present invention requires that both halves of the connector assembly should contain lateral adjustment means. Accordingly, they can be adjusted separately with the assurance that the lateral alignment of the optical fiber core interface will be accurate. The structure of FIG. 4 must of course be adapted to receive either half of a connector assembly employing the coupling means of FIG. 1, however, the required modifications are within the mechanical skills of the art. It is also possible, of course, that the connector half 10 of FIG. 1 with eccentric sleeves fitted therein as in the other connector half 11 could be aligned with a separate apparatus, according to FIG. 4, specifically adapted to coupling thereto.

Other modifications and variations will suggest themselves to those skilled in this art once the principles of the present invention are understood. Given the requirements for lens 33, i.e., some nominal magnification of the projected image at window 34 and a numerical aperture selected to accept cladding emitted rays to the exclusion of core emitted rays, the design of the lens is a matter of the skill of the optical arts. Its representation as a convex-convex lens is schematic only. Normally such a lens would be a plural element device.

In view of the foregoing it is not intended that the scope of this invention should be regarded as limited by the drawings or this description, these being intended to be typical and illustrative only.

What is claimed is:

1. Apparatus for detecting optimum lateral alignment of an end of an optical fiber, said fiber having a core with a first index of refraction and cladding with a second index of refraction, comprising:
   first means for admitting light rays into said optical fiber from the external perimeter thereof at a physical angle producing appreciable light propagation within said fiber toward said fiber end;
   second means for projecting light from said optical fiber end onto a plane, said second means having a numerical aperture for accepting and projecting light rays at angles corresponding to light emerging from said cladding at said optical fiber end and for rejecting light rays at angles corresponding to rays emitted from said core at said optical fiber end, the projected light pattern in said plane having substantially the shape of an annulus;

and third means for measuring deviations in light projected onto said plane with respect to the measured light value corresponding to the location of said annulus when said optical fiber is accurately aligned laterally in two mutually orthogonal coordinates in the plane of said fiber end.

2. Apparatus for detecting optimum lateral alignment of an optical fiber within a support body, said fiber including a circular core and circumferential cladding having an index of refraction lower than that of said core, and having an end surface within a connector body, comprising:

first means for admitting light rays into said optical fiber at a point adjacent said end surface and at an angle producing appreciable light propagation within said fiber, the indices of refraction of said core and cladding causing the emergent light rays from said cladding at said end surface to be at a first angle with respect to the axis of said optical fiber and from said core at a second angle larger than said first angle with respect to said optical fiber axis;

second means comprising a magnifying lens and an aperture plate with a circular opening therein, said lens being arranged to project light rays emerging from said optical fiber end surface onto said aperture plate, said circular opening being congruent with the inside perimeter of said cladding as projected thereon, said lens being arranged to accept and project said light rays at said first angle but not rays at said second angle;

and third means comprising a light-to-electric signal transducer for developing a signal as a function of the amount of projected light passing through said aperture plate opening, the projected light measurement thereby obtained having a minimum value when said optical fiber is accurately aligned laterally.

3. In apparatus for effecting optimum alignment of abutting optical fibers, of the type in which an optical core is surrounded by a cladding material having a refractive index less than that of said core, in a connector assembly in which each of said abutting fibers is contained in a corresponding connector body member, each of said fibers is terminated in a corresponding interface surface, in which said interface surfaces abut in a light transmissive arrangement when said connector body members are mated and in which at least one of said connector body members includes adjustment means for modifying the relative lateral positions of said abutting fibers, the combination comprising:

a housing selectively mateable with said one connector body member having said adjustment means, said housing having an internal aperture plate with a circular window therein, in a plane generally parallel to said optical fiber interface surface and having its center on the centerline of said optical fiber core when said core is accurately aligned laterally;

a lens within said housing for projecting light rays emitted from said optical fiber interface surface onto said aperture plate, said lens being constructed to accept and retransmit substantially only light rays at angles into said lens corresponding to said rays propagated within said cladding, the projected perimeter of said core being congruent with the perimeter of said aperture plate window when said optical fiber is accurately aligned laterally so as to exclude light from said cladding from said window;

and light detecting means arranged to detect light passing through said window, thereby to indicate the condition of said lateral alignment.

4. Apparatus according to claim 2 in which said first means comprises a convex bead of transparent material placed against said optical fiber cladding and having an index of refraction substantially equal to or greater than that of said cladding and a laterally placed source of light rays for directing light into said bead.

5. Apparatus according to claim 4 in which said source of light rays is oriented to direct said light rays at an obtuse angle with respect to the axis of said optical fiber measured between said axis and said rays on the side toward said optical fiber end surface.

6. Apparatus according to claim 2 in which said magnifying lens of said second means comprises a lens of the microscope objective type.

7. Apparatus according to claim 5 in which said obtuse angle is obtained by means of a corresponding bore within a mechanical member which is a part of said support body.

8. Apparatus according to claim 2 in which said light-to-electric transducer is selected from the general class of such transducer including photo diodes, photo transistors, photo voltaic cells and photo resistive devices.

9. The method of monitoring the condition of lateral alignment of the interface surface of the core of a clad optical fiber mounted within a support body having lateral adjustment means to vary the lateral position of said fiber, comprising the steps of:

admitting light rays into said optical fiber from its outer perimeter, at a point in the near vicinity of said interface surface, said admitting being effected at an angle producing substantial light propagation in said optical fiber;

magnifying and projecting light emerging from said interface surface through lens means responsive to light rays at angles corresponding to light emerging from said cladding and rejecting rays at larger angles corresponding to light emerging from said core thereby to project a magnified luminous annular light pattern corresponding to light emerging from said cladding;

and detecting the light condition with an area corresponding to the magnified inside diameter of said luminous annular pattern in a predetermined place of projection, said light condition being substantially a null when said optical fiber has a predetermined lateral position in said support body and a detectable light condition when said luminous annulus is laterally displaced corresponding to misalignment of said fiber in said support body.

10. The method set forth in claim 9 including the further step of providing coaxial aperture means at said plane of projection through which substantially none of the light of said luminous annulus passes when said optical fiber lateral alignment is accurate within said support body, and in which said step of detecting light is carried out through said aperture.

* * * * *